Fig. 1

INVENTORS.
ELVIN S. BRUMFIELD
MICHAEL F. BRAUN
BY George C. Sullivan
Agent

INVENTORS.
ELVIN S. BRUMFIELD
MICHAEL F. BRAUN
BY George C. Sullivan
Agent

Fig. 6

INVENTORS.
ELVIN S. BRUMFIELD
MICHAEL F. BRAUN
BY
George C. Sullivan
Agent

United States Patent Office 3,191,035
Patented June 22, 1965

3,191,035
INFRARED MAPPING SYSTEM
Elvin S. Brumfield, Temple City, Calif., and Michael F. Braun, Burlington, Iowa, assignors to Lockheed Aircraft Corporation, Burbank, Calif.
Filed Dec. 21, 1961, Ser. No. 161,202
8 Claims. (Cl. 250—83.3)

This invention relates to mapping systems in general and more particularly to an airborne mapping system employing infrared techniques.

Several types of airborne mapping systems currently are in use. Of the several types, the photographic type is probably the most widely used. Radar techniques are also used but not to as great an extent as photographic techniques. Each of these two types of mapping systems has certain shortcomings. Photo-reconnaissance systems are severely hampered in cloudy or overcast weather and are thus practically limited to daytime applications. While radar techniques work equally well at day or night, mapping information thus obtained does not approach the quality of resolution obtained through use of photographic techniques, due to several reasons. First, it is virtually impossible through use of radar techniques to distinguish between non-metallic objects of the same height. For instance, a dirt or macadam road running through a field will not be detected by radar techniques. Secondly, the pictorial resolution obtained through use of radar techniques is necessarily quite low since it is virtually impossible to radiate a "pencil beam" which is necessary if high resolution is to be obtained. While radar systems capable of radiating a pencil beam at low altitudes can be constructed through use of expensive and elaborate antenna systems, it is impossible to radiate a pencil beam from high altitudes with the result that many objects in the area of interest will not be detected.

With the recent accelerated research into and development of infrared techniques, an additional avenue of approach has been presented for obtaining information suitable for use in map making. However, infrared techniques heretofore employed have not proved entirely successful in mapping applications for several reasons. One such reason is that the sensitivity of these systems has been quite poor due to the fact that the signal-to-noise ratio of the optical system has been quite low. That is, optical techniques have been employed which allow a relatively large amount of background radiant energy to reach the infrared detector as compared with the desired radiant energy obtained from the earth's surface. Additionally, the signal-to-noise ratio of previous infrared mapping systems has been quite low since the optimum band of radiation frequencies in which the self-emission of objects of interest can be detected, independent of diurnal variations, has not been heretofore used.

Additional problems encountered through use of both radar systems as well as prior art infrared systems are those which arise by virtue of aircraft roll. Aircraft roll will cause the total film width which is normally employed not to record the full scan angle. Also, map distortion is introduced when a constant linear velocity recording system is used in conjunction with a constant angular velocity scan.

It is therefore an object of the present invention to provide a novel airborne mapping system which is equally suited for either day or night applications.

Another object of the present invention is to provide an infrared mapping system capable of producing high-resolution visual images.

Another object of the present invention is to present an optimum band of radiation frequencies in which self-emission of objects of interest can be detected independent of diurnal variations.

Another object of the present invention is to provide an infrared mapping system which is capable of distinguishing between non-metallic objects of the same height.

Another object of the present invention is to provide a unique method of obtaining continuously varying fields of view as a function of aircraft velocity over aircraft height without changing the detector size of the infrared detector to obtain ultimate angular resolution and the smallest possible temperature detectivity for any given altitude.

Another object of the present invention is to provide a roll correction system for stabilizing the scan reference to inertial space so that the total film width which is employed records the full scan angle.

Another object of the present invention is to provide a recording system which eliminates map distortion ordinarily introduced when a constant linear velocity recording system is used in conjunction with a constant angular velocity scan.

Other and further objects and advantages of the present invention will become apparent to one skilled in the art from a consideration of the following detailed description when read in light of the accompanying drawings, in which:

As previously stated, one of the main problems heretofore encountered in conjunction with infrared mapping systems was that of discriminating between the self-emission of objects of interest and that of diurnal variations. Optimumly, it must be determined which particular band or bands of radiation frequencies best lend themselves to use in infrared mapping systems to provide high resolution characteristics.

The radiation that arrives at an infrared detector from the direction of its field of view is the composite of the radiation from a variety of sources within the field of view. Radiation from these sources may be absorbed or scattered by intervening objects, which in turn contribute to the total radiation by their own thermal emission.

During daylight hours, sunlight scattered by air molecules and self-radiation of the earth are the two main conditions affecting radiation patterns. Sunlight scattered by air molecules, fog, haze, clouds, and other particles is significant only in the near infrared, i.e., up to 3 microns. Some of this scattered radiation is absorbed by water vapor and carbon dioxide, but the self-radiation of these constituents of the atmosphere is comparatively weak at these wavelengths due to the lower temperature of the atmosphere.

The self-radiation of the earth and the atmosphere becomes significant at wavelengths longer than 3 microns. At the longer wavelengths, solar radiation and scattering of sunlight decrease sharply while sources at atmospheric temperatures become predominant. During the night, scattering is, of course, absent and self-radiation decreases to a lower level.

Figure 1:
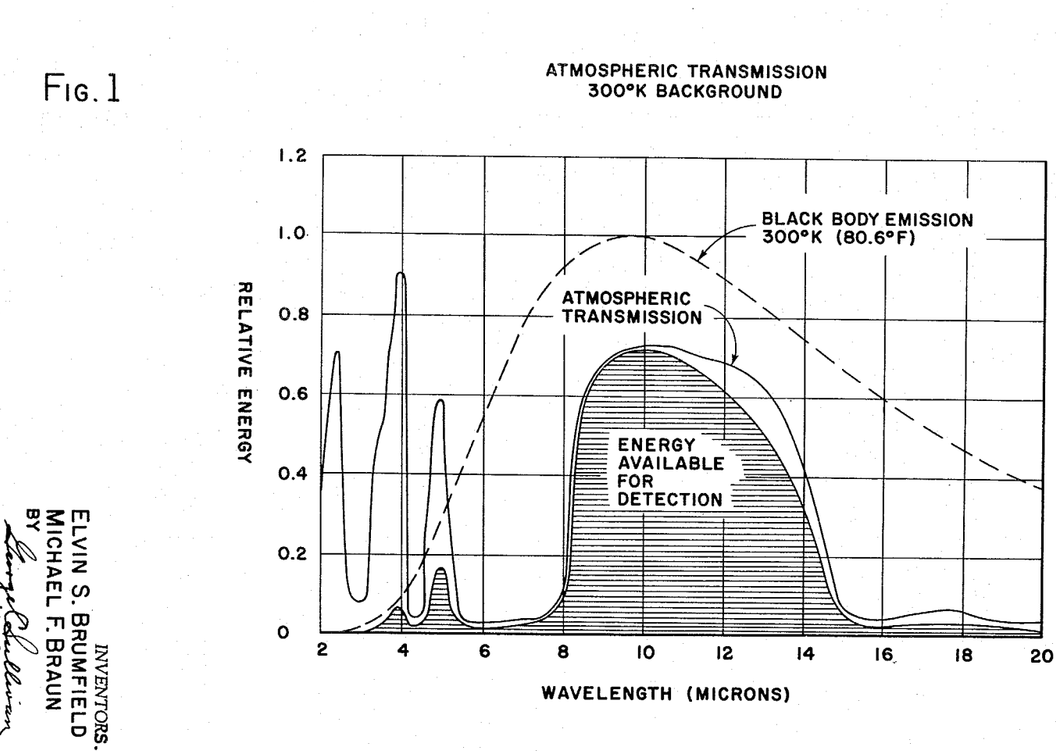
FIGURE 1 is a typical curve of atmospheric transmission through a one-mile path.

Refer first to FIGURE 1 which shows a typical curve of atmospheric transmission through a one-mile path. This figure shows the relative spectral distribution of the energy from a 300° K. graybody as well as the energy available for detection at the aircraft. As can be seen from the shaded areas in the figures which represent energy available for detection, there are only two regions in which there is any energy available for detection. These regions correspond to the two regions of high atmospheric transmission, i.e., at approximately five microns and from eight to fourteen microns.

Figure 2:
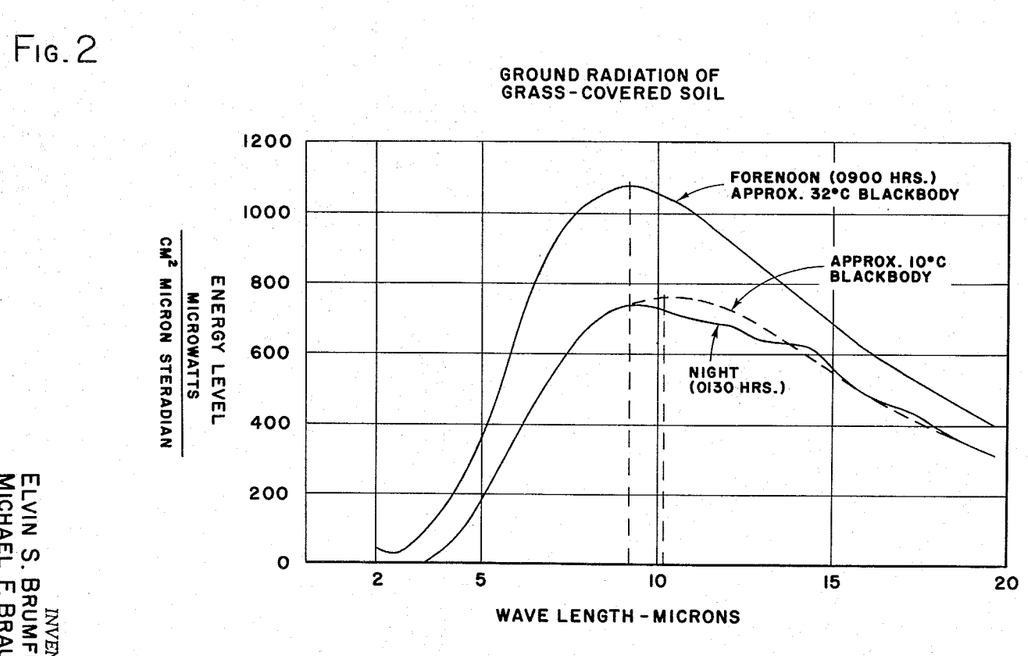
FIGURE 2 shows the spectral radiance of a grass patch with the infrared detector held closely adjacent thereto.

FIGURE 2 shows the spectral radiance of a grass patch measured with the infrared detector located closely adjacent thereto. It can be seen that the spectral radiance taken at forenoon and at night follow very closely the black-body radiation curves for a 32° C. and a 10° C. black-body, respectively. Temperature measurements made simultaneously showed that the temperature of the ground was 11° C. during the nighttime and about 32° C. at forenoon which is very nearly the same as the equivalent black-body radiators.

Figure 3:
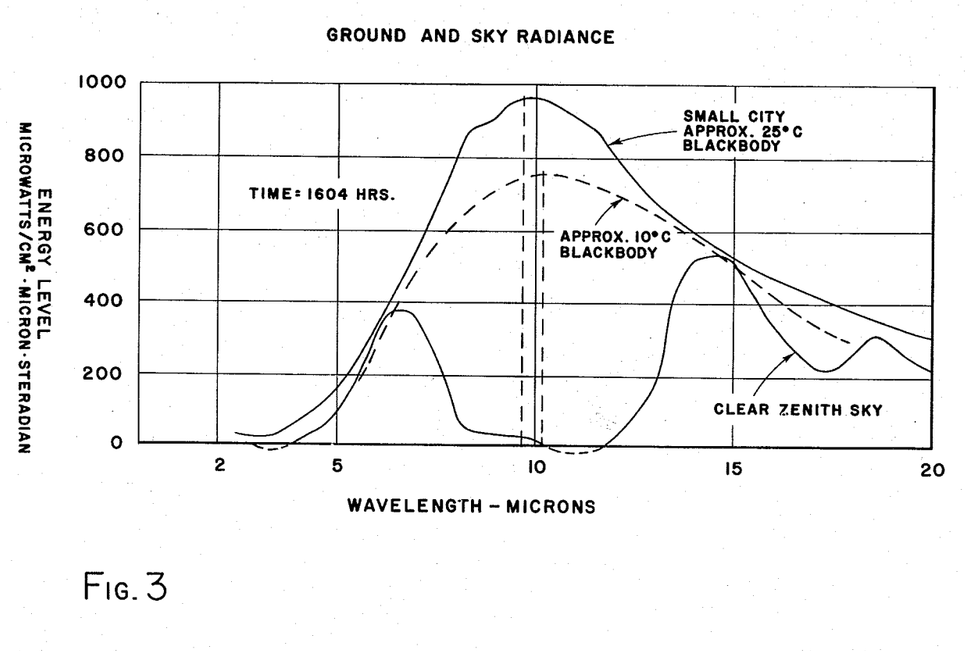
FIGURE 3 is a curve representing the radiance of a small city versus atmosphere radiance.

Referring next to FIGURE 3 which illustrates the effect of the intervening atmosphere with an increase in path length. In FIGURE 3, the curve representing the radiance of a small city appears as a portion of a 25° C. black-body radiation curve. This radiation from the small city was somewhat attenuated due to the path lengths since the measured temperature in the city was 30° C. and the ambient temperature at the monitoring site was 10° C. FIGURE 3 also illustrates that the atmosphere radiates as a 10° C. black-body near 6 and 15 microns. Thus, if wavelengths of 6 and 15 microns are included, the system will tend to measure the energy from the atmosphere in these absorption bands, rather than from the ground. From a consideration of FIGURE 4, it can be seen that the effect of sun glint is clearly evident near four microns.

Figure 4:
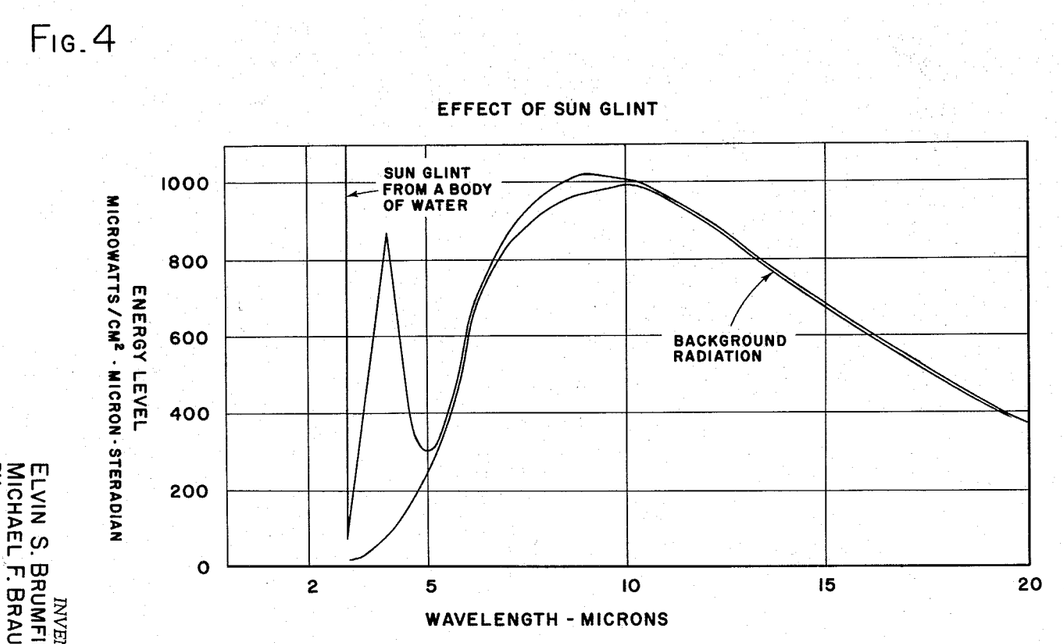
FIGURE 4 is a curve representing sun glint obtained with a sensor looking directly into the virtual image of the sun as reflected by a water surface.

Thus, FIGURES 1 and 4 establish that to detect self-radiation of ground objects, the 8.5 to 13 micron region must be used, otherwise the self-radiation received from ground objects would be swamped by sun glint near 4 microns (FIGURE 4) and obscured by energy from the atmosphere at 6 and 15 microns (FIGURE 1). These figures permit the conclusion that the radiation to be expected from different types of surfaces on the earth is very nearly that obtained from a black-body radiator at the temperature of the particular surface. It therefore becomes apparent that selection of the 8.5 to 13 micron region for the operating range of an infrared mapper will provide a system with the best over-all characteristics from the standpoint of detecting the self-emission of objects of interest independent of diurnal variations. Likewise, through use of this frequency range, a system will result having daylight capabilities nearly equal to those obtained during nighttime operations.

Figure 5:
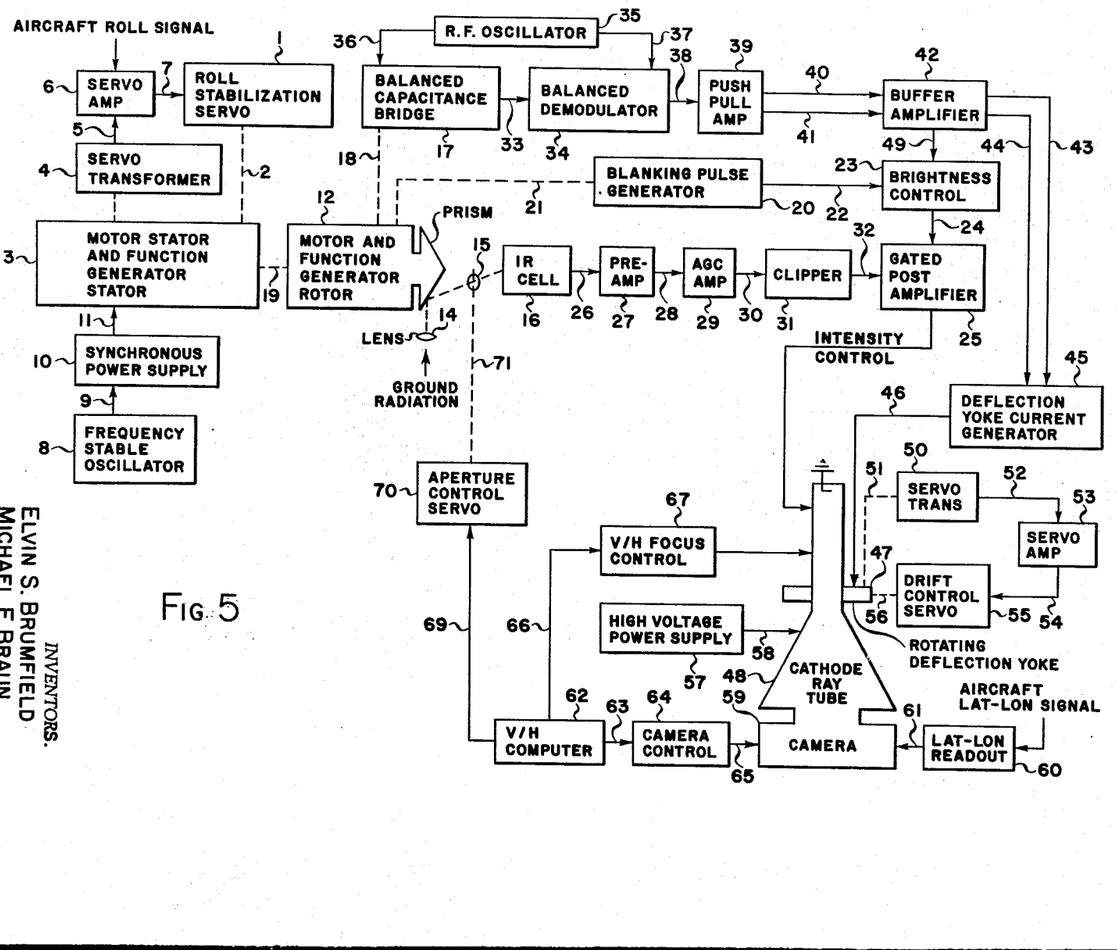
FIGURE 5 is a complete schematic block diagram of the herein described novel infrared mapping system.

Referring next to FIGURE 5 which is a complete schematic block diagram of the novel infrared mapping system which will hereinafter be described. In FIGURE 5 is shown a roll stabilization servo 1, geared by means of a precision gear arrangement 2 (not shown) to a scan-motor stator and function generator stator 3, which, as is later described, are stabilized to inertial space. A servo transformer 4 is driven at a 1 to 1 ratio with the scan motor stator for position feedback. The output of the servo transformer 4 is fed along line 5 to a servo amplifier 6 which is electrically connected by line 7 to the roll stabilization servo 1.

A frequency stable oscillator 8 provides a reference frequency along line 9 to a synchronous power supply 10 which in turn is connected along line 11 to the motor and function generator stator. A motor and function generator rotor 12 have integrally connected thereto a prism 13 which receives ground radiation through lens 14 to thereby project a cone of infrared energy through the variable aperture field stop 15 to the infrared cell 16. A detailed description of the optical system comprising the prism 13, lens 14 and variable aperture field stop 15 will not herein be given nor will a detailed description of the infrared cell 16 and its associated housing be given, reference instead being made to my co-pending patent application Serial No. 162,810 which describes a novel infrared scanner which is ideally suited for use in the herein described infrared mapping system. It should be understood, however, that the characteristics of the prism 13, lens 14, variable field stop 15, and infrared cell 16 should be such that, in accordance with the present invention, radiant energy from the 8.5 to 13 microns wavelengths is readily passed while radiant energy of other wavelengths is effectively blocked. Likewise, the scanner must, as will hereinafter become apparent, have a variable field stop for varying the instantaneous field of view of the detection.

A balanced capacitance bridge 17 is either geared by means of gear means 18 (not shown) to the rotation of the motor and function generator rotor 12 or mounted directly upon the motor and function generator rotor shaft 19. Likewise, a blanking pulse generator 20 is either mounted directly upon the motor and function generator rotor shaft 19 or driven thereby. Pulses from the blanking pulse generator are fed along line 22 to the brightness control means 23. The output of the brightness control means 23 is fed along line 24 to a gated postamplifier 25.

The output of the infrared cell 16 is fed along line 26 to a preamplifier 27, the output of which is fed along line 28 to an automatic gain control amplifier 29. The output of the automatic gain control amplifier 29 is fed along line 30 to a clipper circuit 31, the output of which is fed along line 32 into the postamplifier 25.

The output of the balanced capacitance bridge 17 is fed along line 33 to a balanced demodulator 34. An RF oscillator 35 is electrically connected through line 36 to the balanced capacitance bridge 17 and additionally is connected along line 37 to the balanced demodulator 34. The output of the balanced demodulator 34 is fed along line 38 to the input of a push-pull amplifier 39. The output of the push-pull amplifier 39 is fed along lines 40 and 41 to a buffer amplifier 42. The output of the buffer amplifier 42 is fed along lines 43 and 44 to the deflection yoke current generator 45 which is electrically connected along line 46 to the rotating deflection yoke 47 of a cathode ray display tube 48. Another output of the buffer amplifier 42 is fed along line 49 to the brightness control 23.

An aircraft drift signal is furnished to a servo transformer 50 which is geared to the rotating deflection yoke 47 by means of gear means 51. The output of the servo transformer 50 is fed along line 52 to a servo amplifier 53 which has its output connected along line 54 to the drift control servo 54 which is geared by gear means 56 (not shown) to the rotating deflection yoke 47 located on the cathode ray tube 48.

A high voltage power supply 57 is connected by means of line 58 to the cathode ray tube 48. A camera 59 is removably attached to the presentation face of the cathode ray tube 21. A latitude-longitude-readout 60, which receives latitude-longitude signals from the aircraft, is electrically connected by means of line 61 to the camera 59. A velocity-over-height computer 62 is electrically connected along line 63 to a camera control 64, which in turn is connected along line 65 to the camera 59. The velocity-over-height computer 62 is also connected along line 66 to a velocity-over-height focus control 67 which, in turn, is connected along line 68 to the cathode ray tube 48. Another output from the velocity-over-height computer 62 is fed along line 69 to the aperture control servo 70, which is geared by means of gear means 71 (not shown), to the adjustable aperture 15.

Figure 6:
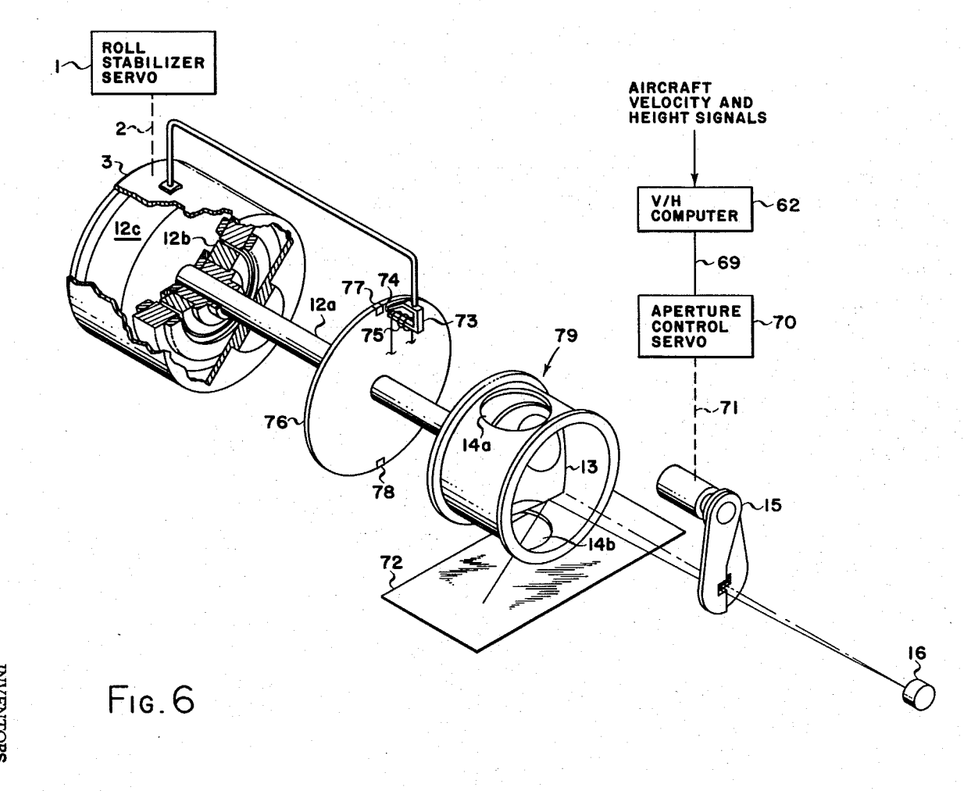
FIGURE 6 is an isometric partial cutaway view of a scanner which may be used in the herein described infrared mapping system.

Refer next to FIGURE 6 wherein is shown one method of mounting the stator 3 of the scan motor and capacitive type function generator. The stator 3 of the capacitive type function generator as well as the stator of the synchronous scan drive motor are driven through precision gear means 2 by the roll stabilization servo 1 as will be hereinafter more fully described. The rotor 12b of the scan motor and the rotor 12c of the capacitive type function generator are fixedly mounted on shaft 12a. Also mounted on shaft 12a are the lens prism system having a two sided prism 13 and two objective lenses 14a and 14b. For convenience in packaging, each lens 14a and 14b may be integrated with a face of the folding reflective prism 13. By this means, the cone of energy from the objective lens scanning the ground area 72 is folded along an axis which converges to meet the projected axis of mechanical rotation at the variable field stop 15 and thence into the detector cell 16.

A blanking pulse pickoff 73 having a gap 74 is rigidly attached to the scan motor and function generator stator 3. A non-magnetic disc 76 having two magnetic slugs 77 and 78 mounted therein is fixedly secured to shaft 12a such that the two magnetic slugs 77 and 78 are in magnetic association with the gap 74. Read windings 78 for detecting the blanking pulses are also wound on the blanking pulse pickoff 73.

System stabilization is necessary in both roll and yaw. In the absence of adequate stabilization in roll, adjacent points along the ground track might be scanned at different times relative to the instant of scan initiation and hence, would not be painted on the film as adjacent points in consecutive scans. In the absence of adequate stabilization or drift correction for yaw, lines on the ground perpendicular to the ground track would appear to be rotated on the film by an amount equal to the drift angle while lines parallel to the track would not be rotated. Thus, angles would not be preserved.

Refer again to FIGURES 5 and 6. In operation, a signal is provided by the aircraft vertical reference to the servo amplifier 6. The element to be stabilized is the scan motor and function generator stator 3 to which the blanking pulse pickoff 73 is rigidly attached as best illustrated by FIGURE 6. The aircraft vertical measures the angle that the scanner frame 3 (see FIGURE 6) has rotated about the roll axis relative to the local vertical. The synchro controlled transformer 4 measures the angle that the stator 3 and blanking pulse pickoff 73 have rotated with respect to the air frame. Electrical signals proportional to these angles are compared in the servo amplifier 16 and a signal is developed proportional to the different angle. This signal causes the servo motor 1 to drive the stator 3 through the precision gear train 2 in the proper direction to make the two angles equal in magnitude and opposite in sense. Thus, the angle of the scan rotor 12b with respect to the local vertical tends to be determined by the instantaneous phase of motor supply voltage, regardless of the instantaneous roll angle of the aircraft.

In addition, stabilization of the stator 3 tends to stabilize the angular velocity of the rotor. In the absence of such stabilization, a rotation of the stator 3 in inertial space would cause an acceleration or deceleration of the synchronously driven rotor 12b in a direction which would tend to restore phase lock. The resultant angular velocity variations would tend to cause loss of resolution and distortion of distances in the direction of scan.

Drift stabilization is performed on the output data rather than at the scanner. Thus, a much simpler mechanical design for the scanner results with little residual distortion.

The drift stabilization system consists of a simple deflection yoke positioning servo 55 and associated circuitry. The servo consists of a synchro controlled transformer 50, servo amplifier 53, servo motor 55 and gear trains 56 and 51. Drift angle data must be supplied as 3 wire synchro data to the control transformer. Error voltage from the rotor winding is amplified and applied to control the phase of the motor 55 in the proper phase to cause the control transformer rotor to be driven to a null position through the gear train 51. The cathode ray tube deflection yoke 47 is driven at the same speed as the control transformer rotor and in the proper sense so that the horizontal CRT sweep is tilted through the same angle with respect to the direction of motion of the film as the scan sweep is rotated with respect to the ground track of the aircraft.

As the radiated energy from objects within the instantaneous field of view of the scanner varies, the output of the weak electrical signal generated by the detector cell 16 also varies. The output of the detector 16 is fed along a short coaxial cable 26 to a preamplifier 27 which is adjacent to the detector 16 to minimize pickup of acoustic, mechanical, thermal, and electromagnetic noise. The preamplifier 27 is preferably encapsulated in a sealed nu-metal case and has an input impedance which is substantially equal to the maximum impedance of the infrared detector 16 generating the input signal. Additionally, the preamplifier has an adjustable gain which can be preset between certain limits as required by variations in detector cell parameters. The output of the preamplifier 27 is fed along line 28 to an AGC amplifier 29 which has a dynamic range of, for instance, 40 db. A normal output voltage is, for instance 3 volts with a minimum input signal from the preamplifier of 30 millivolts.

The AGC amplifier 29 serves as a signal compressor in that its gain varies to keep the average signal output level from overdriving and saturating the associated display elements. Thus, as the average input radiation signal increases, the AGC amplifier 29 decreases in gain. The AGC amplifier time constant is quite long, thus correcting for slowing changing intensity levels by keeping the contrast ratio of the picture approximately the same. It has been found that for the herein described system, an amplifier having a band-pass of approximately 500 kc. is quite satisfactory.

The output of the automatic gain control amplifier 29 is fed along line 30 to a clipper 31 which may be a simple diode clipping circuit. The clipper 31 is used to keep high amplitude instantaneous signals from overdriving and saturating the display elements of the cathode ray tube 48. The output of the clipper 31 is fed along line 32 to a gated postamplifier 25. The gain of the gated postamplifier 35 is controlled as a function of the scan angle. Since the sweep of the cathode ray tube 48 is controlled by the sweep function generator 17, as is hereinafter described, to give a rectilinear sweep, intensity of the cathode ray tube beam would change as a function of sweep rate. To counterbalance this, a compensating gain control is provided.

To take full advantage of the information furnished by the detector 16, it was found necessary to devise a position-data-transmitting device that will follow the scan of the infrared detector 16 and be compatible with the geometry of the scan which is further complicated by the fact that the scan is non-linear. The techniques of providing a display having a scan trace which is a linear function of the ground coverage requires that the trace displacement be a function of the tangent of the scan angle. The most satisfactory solution has proved to be the use of a rotating balanced capacitance bridge network (FIGURE 5).

The detector 79 rotation and the cathode ray tube sweep in the presentation system are synchronized by means of the tangent function generator 17 which consists of a dual rotary capacitor and two fixed capacitors in a bridge configuration which is excited by an RF generator.

The modulation envelope of the RF output of this bridge 17 contains the necessary tangent functions. The modulation of this envelope provides a cathode ray tube horizontal displacement signal which is a function of the angle off vertical of the scanning prism. Therefore, the cathode ray tube presentation is a single linear trace plot of the land encompassed by the detector 79 scan.

The use of this system imposes an amplitude stability requirement on the RF oscillator 35. It must be compatible with the desired limit of amplitude variation of the output of the balanced bridge 17. Thus, small amplitude variations of very slow frequency will not adversely affect trace-to-trace jitter, but will cause slow modulation of the picture. High frequency amplitude variation will, however, affect trace-to-trace jitter adversely. Particular attention must be given to these design criteria.

Demodulation of the envelope of the balanced capacitor bridge 17 provides the CRT horizontal deflection signal. Various demodulation systems were investigated and a phase sensitive demodulator 34 employing a push-pull output was selected.

The output of the demodulator 34 is fed to a buffer amplifier 42 along lines 40 and 41 from which the desired wave form is, in turn, fed along lines 43 and 44 to the deflection selection yoke current generator 45. Since a magnetic deflection yoke 47 is employed for the cathode ray tube 48, the voltage wave form derived from the balanced capacitor bridge demodulator circuitry is converted to the appropriate current wave form required by the deflection yoke 47.

In addition, the output of the buffer amplifier 42 is fed along line 49 and used as a brightness control for the video signal chain to correct for the brightness change caused by the varying sweep rate. During the interval between scans, blanking of the oscilloscope beam is provided by means of the blanking pulse generator which is also driven by the scanning motor. This generator consists of a fixed magnetic pickoff 73 and a rotating magnetic disc 76 carrying two magnetic slugs 77 and 78. The angular length of these slugs along the periphery of the disc coincides with the interval between the end of one scan and the beginning of the next. Thus, blanking is accomplished whenever the slugs 77 and 78 are opposite the pickoff 73 by appropriate gating of the video chain gated post amplifier 25.

A cathode ray tube employing electromagnetic deflection and focusing must be utilized since spot size requirements of the system are not attainable in electrostatic deflection cathode ray tubes. A spot size of 2.0 mils is attainable through use of electromagnetic deflection. Additionally, the electromagnetic yoke size allows a drift compensation which requires only that the electromagnetic yoke 47 be rotated to correspond to the drift angle.

As illustrated by FIGURE 6, scanning traverse to the aircraft flight path over a 120° field of view is accomplished by use of a two sided prism 13 and two single element objective lenses 14a and 14b. Thus, lenses 14a and 14b alternately focus radiant energy on detector 16 through adjustable aperture 15. A single rotation of the prism 13 results in two scans between which, as previously described, the synchronized cathode ray tube sweep is blanked. The electron beam of the cathode ray tube 48 begins its sweep at the same instant as the scan and ends its sweep at the same instant that the scan ends. The accumulated line-by-line record is recorded directly from the fiber optics cathode ray tube face onto photographic film contained in camera 59. The photographic film is advanced at a rate proportional to the angular travel of the terrain below. A map of the terrain is thus generated.

A velocity-height control signal is generated by the velocity height computer 62 which controls by means of aperture control servo 70 the size of aperture 15. Thus, effective fields of view are provided by aperture 15 which vary in accordance with aircraft height and velocity. Thus, in this manner, a variable effective field of view is provided without the need of changing detector sizes. Therefore, through use of a single detector cell, optimum angular resolution and the smallest possible temperature detectivity are obtained.

In the above described manner, there is provided a novel infrared mapping system which is capable of operating in the wavelength region from 8.5 to 13 microns which as was heretofore established as the band of radiation frequencies in which self-emission of objects of interest can most readily be detected, independent of diurnal variations. Moreover, there is provided a method of varying aperture size in accordance with aircraft velocity over height to maintain a continuously varying field of view. Thus, through provision of the above described techniques, there is provided a novel infrared mapping system of high resolution and which additionally is capable of operating during either day or nighttime. Furthermore, the infrared system herein provided is capable of distinguishing between non-metallic objects of the same type. Additionally, distortion, which is ordinarily introduced when a constant linear velocity recording system is used in conjunction with a constant angular velocity scan, has been eliminated. Other inaccuracies, which normally result in scan-type mapping systems due to aircraft roll, are either prevented or compensated for.

We claim:

1. An airborne mapping system comprising: a rotatable optical system, detector in optical alignment with said rotatable optical system which produces an electrical signal in accordance with the radiation within the instantaneous field of view of said rotatable optical system, means for varying the effective scan of said rotating system in response to aircraft height and aircraft velocity, a cathode ray tube having intensity control means, sweep control means, and a presentation face, means connected between said detector and said intensity control means for modulating the intensity of the electron beam of said cathode ray tube in accordance with the electrical signal generated by said detector, means for rotating said rotatable optical system, means for stabilizing said rotating means to inertial space, means for synchronizing the sweep of said cathode ray tube with said rotating optical system to provide a visual display on said presentation face having a scan trace which is a linear function of ground coverage comprising a tangent function generator, driven by said rotating means, an RF oscillator electrically connected to said tangent function generator, means for demodulating the output of said tangent function generator and applying said demodulated output to the sweep means of said cathode ray tube, and camera means in optical association with the presentation face of said cathode ray tube.

2. An airborne infrared mapping system capable of detecting the infrared radiation of objects of interest and providing a visual representation thereof comprising: a rotatable optical system, means for rotating said rotatable optical system comprising a synchronous motor having a rotor and stator, means for stabilizing said stator to inertial space comprising a roll stabilization servo geared to said stator, a servo amplifier electrically connected to said roll stabilization servo, a servo transformer in feedback association with said stator and electrically connected to said servo amplifier, said servo amplifier also receiving an input indicative of aircraft roll, an infrared cell in optical association with said rotatable optical system which produces electrical signal in accordance with the infrared radiation instantaneous field of view of said rotatable optical system, means located between said rotatable optical system and said infrared cell for varying the effective scan of said rotatable optical system responsive to aircraft velocity and aircraft height, a cathode ray tube having intensity control means, sweep control means, and a presentation face, means connecting said infrared cell to said intensity control means for varying the intensity of the electron beam of said cathode ray tube in accordance with the electrical output of said infrared cell, means for synchronizing the sweep of said cathode ray tube with said rotatable optical system comprising a dual rotary capacitor driven at a one ratio by rotor of said synchronous motor, two capacitors in fixed relationship with respect to the stator of said synchronous motor and in bridge configuration with said dual rotary capacitor, an RF oscillator electrically connected to said bridge configuration, demodulation means electrically connected to said bridge configuration, said sweep control means electrically connected to said demodulation means, a drift control servo geared to said sweep control means responsive to an aircraft drift signal to provide drift correction, and a camera in optical association with the presentation face of said cathode ray tube.

3. An airborne infrared mapping system capable of detecting the infrared radiation of objects of interest and providing a visual representation thereof comprising: a rotating optical system, means for rotating said rotatable optical system comprising a synchronous motor having a rotor and stator, a synchronous power supply electrically connected to said synchronous motor, means for stabilizing said stator to inertial space comprising a roll stabilization servo geared to said stator, a servo amplifier electrically connected to said roll stabilization servo, a servo transformer in feedback association with said stator and electrically connected to said servo amplifier, said servo amplifier also receiving an input indicative of aircraft roll, an infrared cell in optical association with said rotatable optical system which provides an electrical signal in accordance with the infrared radiation within the instantaneous field of view of said rotatable optical system, means located between said rotatable optical system and said infrared cell for varying the effective scan of said rotatable system responsive to aircraft velocity and aircraft height comprising a variable aperture field stop, servo means for controlling the size of said variable aperture, a velocity-height computer receptive of aircraft velocity and height signals electrically connected to said aperture servo means, a cathode ray tube having intensity control means, sweep control means, and a presentation face, means connected between said infrared cell and said intensity control means for varying the intensity of the electron beam of said cathode ray tube in accordance with the electrical output of said infrared cell, means for synchronizing the sweep of said cathode ray tube with said rotatable optical system comprising a dual rotary capacitor driven at a one to one ratio by the rotor of said synchronous motor and in bridge configuration with said dual rotary capacitor, an RF generator electrically connected to said bridge configuration, demodulation means electrically connected to said bridge configuration, said sweep control means electrically connected to said demodulation means, a drift control servo geared to said sweep control means responsive to a signal indicative of aircraft drift to provide drift compensation, and a camera in optical association with the presentation face of said cathode ray tube.

4. An airborne infrared mapping system capable of detecting the infrared radiation of objects of interest and providing a visual representation thereof comprising: a synchronous motor having a rotor and stator, means for stabilizing said stator to inertial space, a rotating optical system driven by said rotor, an infrared cell in optical association with said rotatable optical system which provides an electrical signal in accordance with infrared radiation within the instantaneous field of view of said rotatable optical system, means located between said rotatable optical system and said infrared cell for varying the effective scan of said rotatable optical system responsive to aircraft velocity and aircraft height comprising a variable aperture field stop, servo means for controlling the size of said variable aperture connected thereto, a velocity-height computer receptive of aircraft velocity and height signals electrically connected to said aperture servo means, a cathode ray tube having intensity control means, sweep control means, and a presentation face, means connected between said infrared cell and said intensity control means for varying the intensity of the electron beam of said cathode ray tube in accordance with the output of said infrared cell, means for synchronizing the sweep of said cathode ray tube with said rotatable optical system comprising a dual rotary capacitor driven at a one to one ratio by the rotor of said synchronous motor, two capacitors fixed with respect to the stator of said synchronous motor and in bridge configuration with said dual rotary capacitor, an RF generator electrically connected to said bridge configuration, demodulation means electrically connected to said bridge configuration, the output of said demodulation means being electrically connected to the sweep control means of said cathode ray tube, a drift control servo geared to said sweep control means responsive to a signal indicative of the aircraft drift to provide drift compensation, and a camera in optical association with the presentation face of said cathode ray tube.

5. An airborne infrared mapping system capable of detecting the infrared radiation of objects of interest and providing a visual representation thereof comprising: a synchronous motor having a rotor and stator, means for stabilizing said stator to inertial space, synchronous power supply means electrically connected to said synchronous motor, a rotatable optical system driven by said rotor, an infrared cell in optical association with said rotatable optical system which produces an electrical signal in accordance with infrared radiation within the instantaneous field of view of said rotatable optical system, a variable aperture field stop located between said rotatable optical system and said infrared cell, means for controlling the aperture size of said variable aperture field stop in accordance with aircraft velocity and height, a cathode ray tube having intensity control means, sweep control means, and a presentation face, means for synchronizing the sweep of said cathode ray tube with said rotating optical system, means connected to said intensity control means for controlling the brightness of the video signal chain of said cathode ray tube to correct for brightness changes resulting from varying scan rates, means connected to said intensity control means for blanking the sweep of said cathode ray tube during retrace time, means for controlling the intensity of the electron beam of said cathode ray tube responsive to the output of said infrared cell, drift correction means geared to the sweep control means of said cathode ray tube, and camera means in optical association with the presentation face of said cathode ray tube.

6. An airborne infrared mapping system capable of detecting the infrared radiation of objects of interest and providing a visual representation thereof comprising: a rotating optical system, means for rotating said rotatable optical system comprising a synchronous motor having a rotor and stator, a synchronous power supply electrically connected to said synchronous motor, means for stabilizing said stator to inertial space comprising roll stabilization servo geared to said stator, a servo amplifier electrically connected to said roll stabilization servo, a servo transformer in feedback association with said stator, the output of said servo transformer being fed to said servo amplifier, said servo amplifier also receiving an input indicative of aircraft roll, an infrared cell in optical association with said rotatable optical system which provides an electrical signal in accordance with infrared radiation within the instantaneous field of said rotatable optical system, means located between said rotatable optical system and said infrared cell for varying the effective scan of said rotatable optical system responsive to aircraft velocity and aircraft height comprising a field stop having a variable aperture, servo means for controlling the size of said variable aperture, a velocity-height computer electrically connected to said aperture control servo means, a cathode ray tube having intensity control means, sweep control means, and a presentation face, means for varying the intensity of the electron beam of said cathode ray tube in accordance with the electrical output of said infrared cell, means for synchronizing the sweep of said cathode ray tube with said rotatable optical system comprising a dual rotary capacitor driven at a one to one ratio by the rotor of said synchronous motor, two capacitors fixed with relation to the stator of said synchronous motor and in bridge configuration with said dual rotary capacitor, an RF generator electrically connected to said bridge configuration, demodulation means electrically connected to said bridge configuration, the output of said demodulation means being electrically connected to the deflection control means of said cathode ray tube, drift compensation means comprising a drift control servo geared to the sweep control means, a drift servo amplifier, a drift servo transformer in feedback association with said deflection control means, said drift servo amplifier being electrically connected to both said drift servo transformer and said drift control servo, said servo amplifier also receiving an input from said aircraft indicative of aircraft drift, and a camera in optical association with the presentation face of said cathode ray tube.

7. An airborne infrared mapping system capable of detecting the infrared radiation of objects of interest and providing a visual representation thereof comprising: a synchronous motor having a rotor and stator, means for stabilizing said stator to inertial space, a synchronous power supply electrically connected to said synchronous motor, a rotatable optical system driven by said rotor, an infrared cell in optical association with said rotatable optical system which provides electrical signals according to the infrared radiation within the instantaneous field of view of said rotatable optical system, a field stop having a variable aperture located between said rotatable optical system and said infrared cell, servo means connected to said variable aperture field stop responsive to a velocity over height computer, a dual rotary capacitor connected to said rotor, two capacitors fixed with respect to the stator of said synchronous motor and in bridge configuration with said dual rotary capacitor, an RF generator electrically connected to said bridge configuration, demodulation means electrically connected to said bridge configuration, first amplification means having two outputs electrically connected to said demodulation means, a cathode ray tube having intensity control means, sweep control means, focus control means and a presentation face, said first amplification means having one of said outputs electrically connected to deflection current generating means, said deflection current generating means electrically connected to said sweep control means, a blanking pulse generator driven in one to one ratio by said rotor of said synchronous motor, a brightness control means, the output of said blanking pulse generator being fed into said brightness control means, the other of said outputs of said first amplification means being fed into said brightness control means, said intensity control means receptive of electrical signals from both said brightness control means and second amplification means electrically connected to said infrared cell, drift control means associated with said sweep control means, focus control means electrically connected to said velocity over height computing means for controlling the focus of said cathode ray tube, and a camera in optical association with the presentation face of said cathode ray tube.

8. An airborne infrared mapping system capable of detecting the infrared radiation of objects of interest and providing a visual representation thereof comprising: a synchronous motor having a rotor and stator, a roll stabilization servo geared to said synchronous motor stator, a servo transformer attached to said synchronous motor stator, a servo amplifier, said servo transformer being electrically connected to said servo amplifier, said servo amplifier also being receptive of an electrical signal indicative of aircraft roll, said servo amplifier being electrically connected to said roll stabilization servo, a synchronous power source electrically connected to said synchronous motor, a function generator stator fixedly connected to said motor stator, a balanced capacitance bridge driven in one to one ratio with said synchronous motor rotor, a balanced demodulator electrically connected to said balance capacitance bridge, an RF oscillator electrically connected to both said balanced demodulator and said balanced capacitance bridge, a push-pull amplifier electrically connected to said balanced demodulator, a buffer amplifier electrically connected to said push-pull amplifier, a deflection yoke current generator electrically connected to said buffer amplifier, a cathode ray tube having an intensity control, a rotating deflection yoke, a focus control, and a presentation face, said deflection yoke current generator being electrically connected to said rotating deflection yoke, a blanking pulse generator driven at a one to one ratio by said synchronous motor rotor, a brightness control means electrically connected to said blanking pulse generator, said buffer amplifier also electrically connected to said brightness control means, a rotatable optical system driven by said synchronous motor rotor, an infrared cell in optical association with said optical system, a field stop having a variable aperture located between said rotatable optical system and said infrared cell, an aperture control servo geared to said variable aperture, a velocity over height computer electrically connected to said aperture control servo, a velocity over height focus control electrically connected to said velocity over height computer, the output of said velocity over height focus control being electrically connected to the said focus control of said cathode ray tube, camera control means electrically connected to said velocity over height computer, a camera in optical association with the presentation face of said cathode ray tube, said camera control means electrically connected to said camera, a preamplifier electrically connected to said infrared cell, an automatic gain control amplifier electrically connected to said preamplifier, clipping means electrically connected to said automatic gain control amplifier, a gated post amplifier electrically connected to said clipping means, said gated post amplifier also receiving an input from said brightness control means, said gated post amplifier being electrically connected to said intensity control means of said cathode ray tube, a drift control servo geared to said rotating deflection yoke, a drift servo transformer in feedback association with said rotating deflection yoke, a drift servo amplifier, said drift servo transformer electrically connected to said drift servo amplifier, said drift servo amplifier also being electrically connected to said drift control servo, said drift servo amplifier also receiving an electrical signal indicative of aircraft drift.

References Cited by the Examiner
UNITED STATES PATENTS

| | | | |
|---|---|---|---|
| 2,431,625 | 11/47 | Tolson | 250—83.3 X |
| 2,882,416 | 4/59 | Fairbanks et al. | 250—83.3 |
| 2,945,414 | 7/60 | Blackstone. | |
| 2,967,211 | 1/61 | Blackstone et al. | 88—1 |

RALPH G. NILSON, *Primary Examiner.*

ARCHIE R. BORCHELT, *Examiner.*